United States Patent [19]
Trzmiel et al.

[11] Patent Number: 6,053,137
[45] Date of Patent: Apr. 25, 2000

[54] DEVICE FOR SUPPLYING PRESSURE MEDIUM AND/OR LUBRICANT TO A HYDRAULIC CONSUMER IN AN INTERNAL COMBUSTION ENGINE

[75] Inventors: Alfred Trzmiel, Grafenberg; Wolfgang Stephan, Boll; Axel-Willi Jochim, Nuertingen, all of Germany

[73] Assignees: Hydraulik Ring GmbH, Nuertingen; Dr. Ing. h.c.F. Porsche AG, Weissach, both of Germany

[21] Appl. No.: 09/213,230

[22] Filed: Dec. 17, 1998

[30] Foreign Application Priority Data

Dec. 17, 1997 [DE] Germany ............... 197 56 018

[51] Int. Cl.⁷ .................................................. F01L 1/34
[52] U.S. Cl. ............................ 123/90.17; 123/90.15; 123/90.19; 123/90.12
[58] Field of Search ............... 123/90.12, 90.13, 123/90.15, 90.16, 90.17, 90.19, 90.33, 90.34

[56] References Cited

U.S. PATENT DOCUMENTS

| | | | |
|---|---|---|---|
| Re. 34,596 | 5/1994 | Masuda et al. ............... | 123/90.16 |
| 1,775,362 | 9/1930 | Demarcus . | |
| 4,231,543 | 11/1980 | Zurner et al. ............... | 251/57 |
| 4,278,233 | 7/1981 | Zurner et al. ............... | 251/57 |
| 4,614,527 | 9/1986 | Reimann . | |
| 4,714,484 | 12/1987 | Kuehl et al. . | |
| 5,367,992 | 11/1994 | Butterfield et al. ............... | 123/90.17 |
| 5,507,259 | 4/1996 | Tanaka ............... | 123/196 M |
| 5,657,722 | 8/1997 | Hollis ............... | 123/41.08 |

FOREIGN PATENT DOCUMENTS

| | | |
|---|---|---|
| 1473127A | 3/1967 | France . |
| 762879 | 5/1950 | Germany . |
| 2061597 | 6/1972 | Germany . |
| 2240447 | 2/1974 | Germany . |
| 2416910 | 8/1977 | Germany . |
| 3623238 | 2/1988 | Germany . |
| 3623238A1 | 2/1988 | Germany . |
| 3937644 | 5/1991 | Germany . |
| 4202499 | 8/1992 | Germany . |
| 19505741 | 8/1996 | Germany . |
| 2117662A | 10/1983 | United Kingdom . |
| 2231508A | 11/1990 | United Kingdom . |

*Primary Examiner*—Weilun Lo
*Attorney, Agent, or Firm*—Evenson, McKeown, Edwards & Lenahan, P.L.L.C.

[57] ABSTRACT

A device supplying a hydraulic consumer in an internal combustion engine is provided with an air withdrawal chamber located in a pressure line for removing air from the oil. The air is removed using an expansion chamber formed in the pressure line which has a valve-controlled connection to the supply tank.

20 Claims, 1 Drawing Sheet

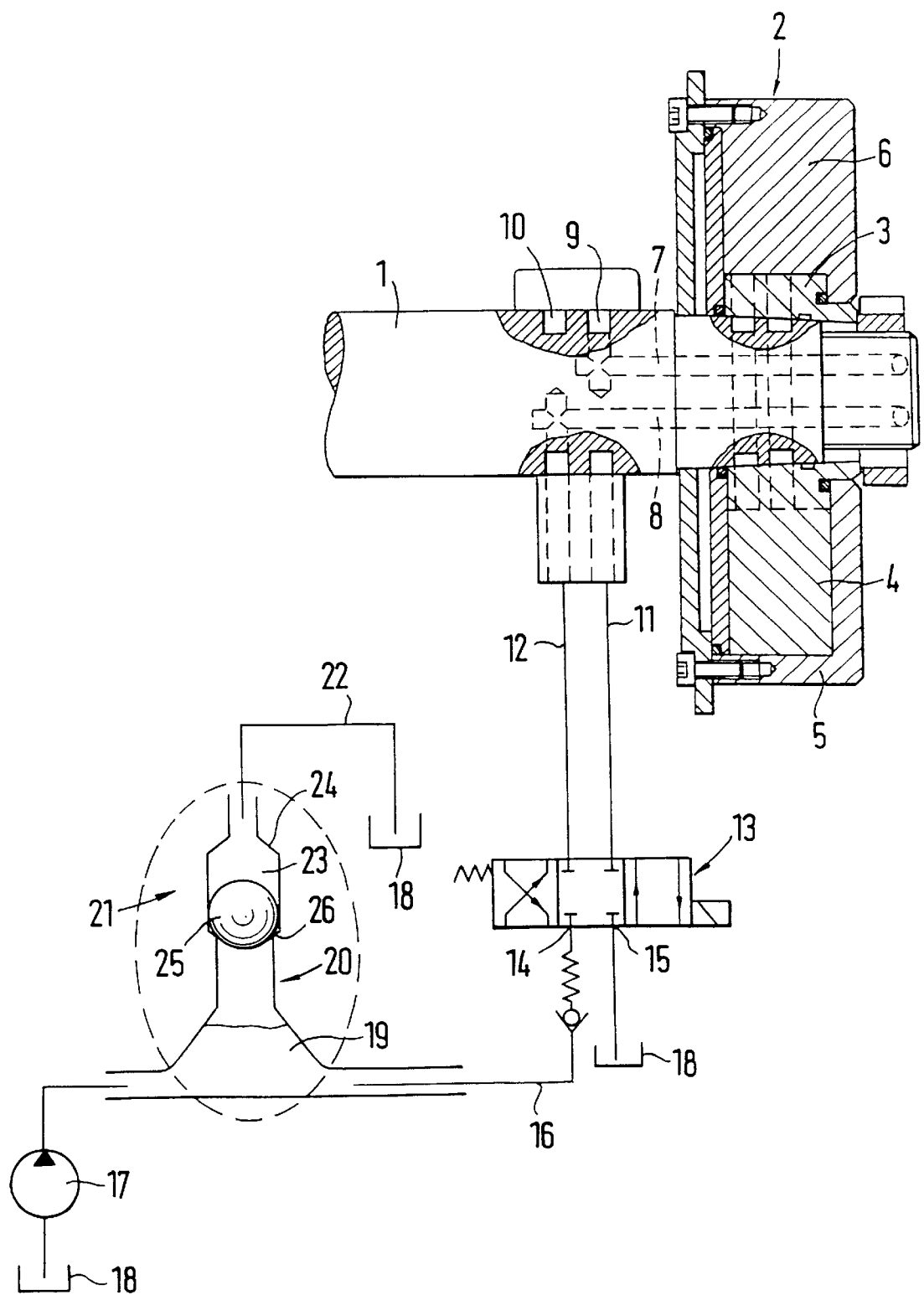

DEVICE FOR SUPPLYING PRESSURE MEDIUM AND/OR LUBRICANT TO A HYDRAULIC CONSUMER IN AN INTERNAL COMBUSTION ENGINE

BACKGROUND AND SUMMARY OF THE INVENTION

This application claims the priority of German application 197 56 018.0, filed Dec. 17, 1997, the disclosure of which is expressly incorporated by reference herein.

The invention relates to a device for supplying pressure medium and/or lubricant to at least one hydraulic consumer in an internal combustion engine and including features to remove air from the pressure medium and/or lubricants.

In preferred embodiments of the invention, the air removing features are disposed in a pressure line from a pressure medium source or supply tank to the hydraulic consumer.

A device of this general kind is known for example from German Patent Document DE 36 23 238 C2. This document describes a pressure medium supply for hydraulic valve play compensating elements of an internal combustion engine which are to be supplied with essentially air-free oil from the lubricating oil circuit. The air is removed from the oil using a cyclone air separator located on the pressure side between the oil pump and the hydraulic consumer. To effectively remove the air from the oil, cyclone air separators, because of their operating principle, must have flow passing through them at relatively high flowrates or flow volumes. For this purpose, a description is provided in this document that says that in addition to the connection for the hydraulic valve play compensating element, at least one connection for additional lubricant consumers is provided. These consumers are for example designed as spray nozzles for supplying the lubricant to the sliding surfaces of the cams. A sufficient flowrate and/or a sufficient lubricant throughput in the cyclone air separator is guaranteed through these consumers with a relatively high lubricant throughput, making removal of the air from the oil possible.

On the contrary, a goal of the invention is to improve devices of the above-described kind for supplying pressure medium and/or lubricant to at least one hydraulic consumer in an internal combustion engine by virtue of the fact that effective removal of the air on the pressure side is possible even at low volume flows. Moreover this device is intended to be used in pressure-controlled or pressure-regulated consumers.

This goal is achieved according to the invention by removing the air utilizing an expansion chamber that has a valve controlled connection to the supply tank. By providing an expansion chamber in the pressure line to the consumer, which has a valve-controlled connection to the supply tank, removal of air from the oil can be guaranteed even at low flowrates and/or low flow volumes. By locating this expansion chamber in the pressure line, a local reduction of the flowrate is achieved that improves the removal of the air from the air-oil mixture. This arrangement is also especially simple in design and consequently can be manufactured economically. In addition this device according to the invention has the advantage that it takes up only a small amount of extra space.

Removal of the air from the oil delivered to the consumer is especially effective if the valve-controlled connection between the expansion chamber and the supply tank is located at least approximately in the vicinity of the point in this expansion chamber that is geodetically highest in the installed or operating position. As a result of this spatial arrangement, removal of the air from the oil by outgassing the air dissolved in the oil is significantly improved.

The valve-controlled connection between the expansion chamber and the supply tank can thus be designed in an especially simple, economical, and effective manner in the form of a ball valve with a conical valve seat. A valve of this kind is especially simple and economical to manufacture and is also functional in the long term, even under the operating conditions that prevail in internal combustion engines.

Especially effective removal of the air from the oil takes place if the valve ball is designed according to certain preferred embodiments with play in a correspondingly designed section of the connecting line to the supply tank. The dimensions of the valve ball and the receiving section of the connecting line are adjusted to one another in an advantageous manner in such fashion that a specific gap is set between the valve ball and the connecting line portion provided the valve ball does not abut the valve seat. The dimensions of the valve member and the receiving portion of the connecting line are adjusted to one another in such fashion that the valve member is guided with play, so that air can flow through the annular gap while the passage of oil at this point is largely prevented.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic representation of a pressure medium supply system for a hydraulic consumer in the form of a camshaft rotational adjustment assembly, constructed according to a preferred embodiment of the invention.

DETAILED DESCRIPTION OF THE DRAWINGS

In the drawing, 1 refers to the camshaft of an internal combustion engine with which a device known for example from German Patent Document DE 39 37 644 A1 is associated endwise for hydraulic rotational angle adjustment of the camshaft relative to its drive wheel and/or to the crankshaft. This adjusting device 2 has an inner part 3 connected nonrotatably with the camshaft, said part being provided with radial ribs 4. These ribs divide the compartments, delimited by radial ribs 6, of a compartmented wheel 5, into two pressure chambers each that act in opposite directions. Compartment wheel 5 is simultaneously a drive wheel and is connected for example with a chain drive or belt drive with the crankshaft of the internal combustion engine. By suitable pressurization of the pressure chambers, inner part 3 that is connected with camshaft 1 can be rotated relative to compartmented wheel 5 so that the phase position of the cams that actuate the gas exchange valves changes.

The hydraulic control for the pressure chambers is provided by two pressure channels 7 and 8 that are provided separately from one another in the camshaft, said channels each being connected by two annular grooves 9 and 10 formed in the camshaft bearing 9 with a control line 11 and 12, respectively. The two control lines 11 and 12 are connected with a control valve 13 which in this embodiment is designed as a 4/3-way valve. Control valve 13 has a pressure connection 14 and a return connection 15. Pressure connection 14 is connected by a pressure line 16 with the lubricant pump 17 of the internal combustion engine that acts as the pressure medium source. The pump in turn is connected by a suction line with the oil supply tank 18 or the oil pan of the internal combustion engine. Return connection 15 of the control valve is likewise connected with this oil supply tank 18.

In the neutral position of the control valve, both pressure line 16 and return connection 15 and the two control lines 11 and 12 are sealed on the valve side. In one switch position of control valve 13, pressure line 16 is connected with control line 11. Control line 12 is in turn connected by return connection 15 with oil supply tank 18. In the second switching position of control valve 13, pressure line 16 is connected with control line 12 while control line 11 is opened to oil supply tank 18. In the two switch positions I and III of control valve 13, because of the pressure differential prevailing in the pressure chambers then connected, there is a rotation of the inner part relative to the compartmented wheel. Then for example in switch position I, the inner part is rotated relative to the compartmented wheel clockwise, while in switch position III, the relative rotation takes place counterclockwise. In neutral position II, the relative positions of the two rotatable parts of the adjusting device are maintained or secured by hydraulic clamping.

In pressure line 16, a portion with an enlarged cross section is formed which serves as an expansion chamber 19. This expansion chamber 19 is so designed that the expansion of the cross section is located essentially in an upper, geodetically higher area. A line segment 20 is formed on the top of this expansion chamber 19, said segment being connected by a valve element 21 with a return 22 that leads to oil supply tank 18. Valve element 21 essentially consists of a section 23 of line segment 20 that has an enlarged diameter. The end of line segment 20 that faces away from expansion chamber 19 is designed as a conical valve seat 24. In this expanded segment 23, a valve member 25 designed as a valve ball is guided with play in such fashion that it is movable between valve seat 24 and a shoulder 26 formed by the transition to expanded section 23.

The valve ball is guided within segment 23 with limited play. This play between the inside wall of segment 23 and the circumference of the valve ball is dimensioned so that the annular gap formed is large enough to allow air to pass through but largely prevents oil from passing through. In this embodiment, the valve ball is made of a polyamide (PA 6.6). Its diameter is 10 mm at an ambient temperature of 20° C. The segment 23 that guides the valve ball is made of aluminum or an aluminum alloy. Its diameter at 20° C. ambient temperature is 10.13 mm. As a result of the different materials and their different coefficients of thermal expansion, assurance is provided that the gap between the valve ball and the line segment is reduced as the temperature of the oil or the ambient temperature rise. The temperature-dependent change in oil viscosity is thus compensated. The dimensions of this embodiment are selected on the basis of the material parameters given such that the gap between the valve ball and the line segment at an oil temperature of 160° C. tends toward zero. This ensures that even at very high oil temperatures, a sufficient pressure level for supplying oil to the consumers can be reached.

During the operation of the internal combustion engine, pressure line 16 is constantly exposed to the delivery pressure of oil pump 17. As long as control valve 13 is in its closed, neutral position II, valve ball 25 is pressed by the pressure in pressure line 16 and/or expansion chamber 19 against valve seat 24. The connection of expansion chamber 19 to return 22 is then closed. If control valve 13 is switched into one of its two switching positions I or III, the pressure in pressure line 16 falls slightly because of the pressurization and the increase in volume in the pressure chambers of the adjusting device. As a result, the valve ball, with a suitable design of the effective areas and sizes, can clear the valve seat under the influence of gravity and sink downward until it abuts shoulder 26. Because of the increase in cross section, the flowrate of the delivered oil falls in the area of expansion chamber 19. As a result of the reduced flowrate, the air dissolved in the oil can escape in the vicinity of the expansion chamber and collect in the upper area of the expansion chamber. As a result of the previously described play between the valve ball and the inside wall of section 23, the air that escapes from the oil can pass through this annular gap into return 22. If the oil level in expansion chamber 19 rises during the operation of the internal combustion engine to the point where no air cushion with respect to valve ball 25 remains, the latter is pressed once again against valve seat 24 by the rising oil or the increase in oil pressure in the expansion chamber, so that the expansion chamber is again sealed off from the oil supply tank.

In contrast to the embodiment shown here, it is also possible to urge the valve member by a spring element toward the expansion chamber. The spring force should then be set for a counteracting pressure of about 2 bars.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for pressure medium and/or lubricant supply to at least one hydraulic consumer in an internal combustion engine with a pressure medium source that is supplied by a supply tank and with an air withdrawal assembly for removing air from the pressure medium and/or lubricant, which are located in a pressure line to the hydraulic consumer, wherein the air withdrawal assembly for removing the air comprises an expansion chamber that has a valve-controlled connection to said supply tank.

2. Device for supplying pressure medium and/or lubricant to at least one hydraulic consumer in an internal combustion engine according to claim 1, wherein the connection to the supply tank is located at least approximately in a vicinity of a point in the expansion chamber that is geodetically highest in the installed or operating position.

3. Device for supplying pressure medium and/or lubricant to at least one hydraulic consumer in an internal combustion engine according to claim 1, wherein the valve-controlled connection to the supply tank is designed as a vent valve with a valve member designed as a valve ball and a valve seat designed as a conical seat.

4. Device for supplying pressure medium and/or lubricant to at least one hydraulic consumer in an internal combustion engine according to claim 2, wherein the valve-controlled connection to the supply tank is designed as a vent valve with a valve member designed as a valve ball and a valve seat designed as a conical seat.

5. Device for supplying pressure medium and/or lubricant to at least one hydraulic consumer in an internal combustion engine according to claim 3, wherein the valve member is guided with play in a section of a connecting line to the pressure line.

6. Device for supplying pressure medium and/or lubricant to at least one hydraulic consumer in an internal combustion engine according to claim 4, wherein the valve member is guided with play in a section of a connecting line to the pressure line.

7. Device for supplying pressure medium and/or lubricant to at least one hydraulic consumer in an internal combustion engine according to claim 5, wherein the play between the valve member and the section of the connecting line is reduced with increasing temperature of the pressure medium and/or lubricant.

8. Device for supplying pressure medium and/or lubricant to at least one hydraulic consumer in an internal combustion engine according to claim 6, wherein the play between the valve member and the section of the connecting line is reduced with increasing temperature of the pressure medium and/or lubricant.

9. Device for supplying pressure medium and/or lubricant to at least one hydraulic consumer in an internal combustion engine according to claim 5, wherein the play of the valve member relative to a receiving segment of the connecting line is so designed that air can flow past the valve member, provided the latter is not abutting the valve seat, and wherein the passage of lubricant or pressure medium between the valve member and the guiding segment of the connecting line is at least largely prevented when the valve member is not yet resting on the valve seat.

10. Device for supplying pressure medium and/or lubricant to at least one hydraulic consumer in an internal combustion engine according to claim 8, wherein the play of the valve member relative to a receiving segment of the connecting line is so designed that air can flow past the valve member, provided the latter is not abutting the valve seat, and wherein the passage of lubricant or pressure medium between the valve member and the guiding segment of the connecting line is at least largely prevented when the valve member is not yet resting on the valve seat.

11. Device for supplying pressure medium and/or lubricant to at least one hydraulic consumer in an internal combustion engine according to claim 1, wherein the consumer is a device for varying the valve control times and/or the valve lift of the internal combustion engine.

12. Device for supplying pressure medium and/or lubricant to at least one hydraulic consumer in an internal combustion engine according to claim 4, wherein the consumer is a device for varying the valve control times and/or the valve lift of the internal combustion engine.

13. Device for supplying pressure medium and/or lubricant to at least one hydraulic consumer in an internal combustion engine according to claim 10, wherein the consumer is a device for varying the valve control times and/or the valve lift of the internal combustion engine.

14. Device for supplying pressure medium and/or lubricant to at least one hydraulic consumer in an internal combustion engine according to claim 1, wherein the consumer is a device for changing the rotational position of the camshaft relative to the crankshaft.

15. Device for supplying pressure medium and/or lubricant to at least one hydraulic consumer in an internal combustion engine according to claim 4, wherein the consumer is a device for changing the rotational position of the camshaft relative to the crankshaft.

16. Device for supplying pressure medium and/or lubricant to at least one hydraulic consumer in an internal combustion engine according to claim 10, wherein the consumer is a device for changing the rotational position of the camshaft relative to the crankshaft.

17. An air withdrawal assembly for withdrawing air from hydraulic fluid being supplied from a supply tank to an engine consumer via a pressure line, said assembly comprising:

an expansion chamber in said pressure line, and a valve controlled connection between the expansion chamber and the supply tank.

18. An assembly according to claim 17, wherein the connection to the supply tank is located at least approximately in a vicinity of a point in the expansion chamber that is geodetically highest in the installed or operating position.

19. An assembly according to claim 17, wherein the valve-controlled connection to the supply tank is designed as a vent valve with a valve member designed as a valve ball and a valve seat designed as a conical seat.

20. An assembly according to claim 18, wherein the valve-controlled connection to the supply tank is designed as a vent valve with a valve member designed as a valve ball and a valve seat designed as a conical seat.

* * * * *